March 29, 1966 W. P. SUMMERS 3,243,813
MONOPULSE RADAR SYSTEM PROVIDING COMMON AMPLIFICATION
OF PLURAL SIGNALS
Filed May 15, 1961 3 Sheets-Sheet 1

INVENTOR
WILLARD P. SUMMERS
BY George J. Netter
ATTORNEY

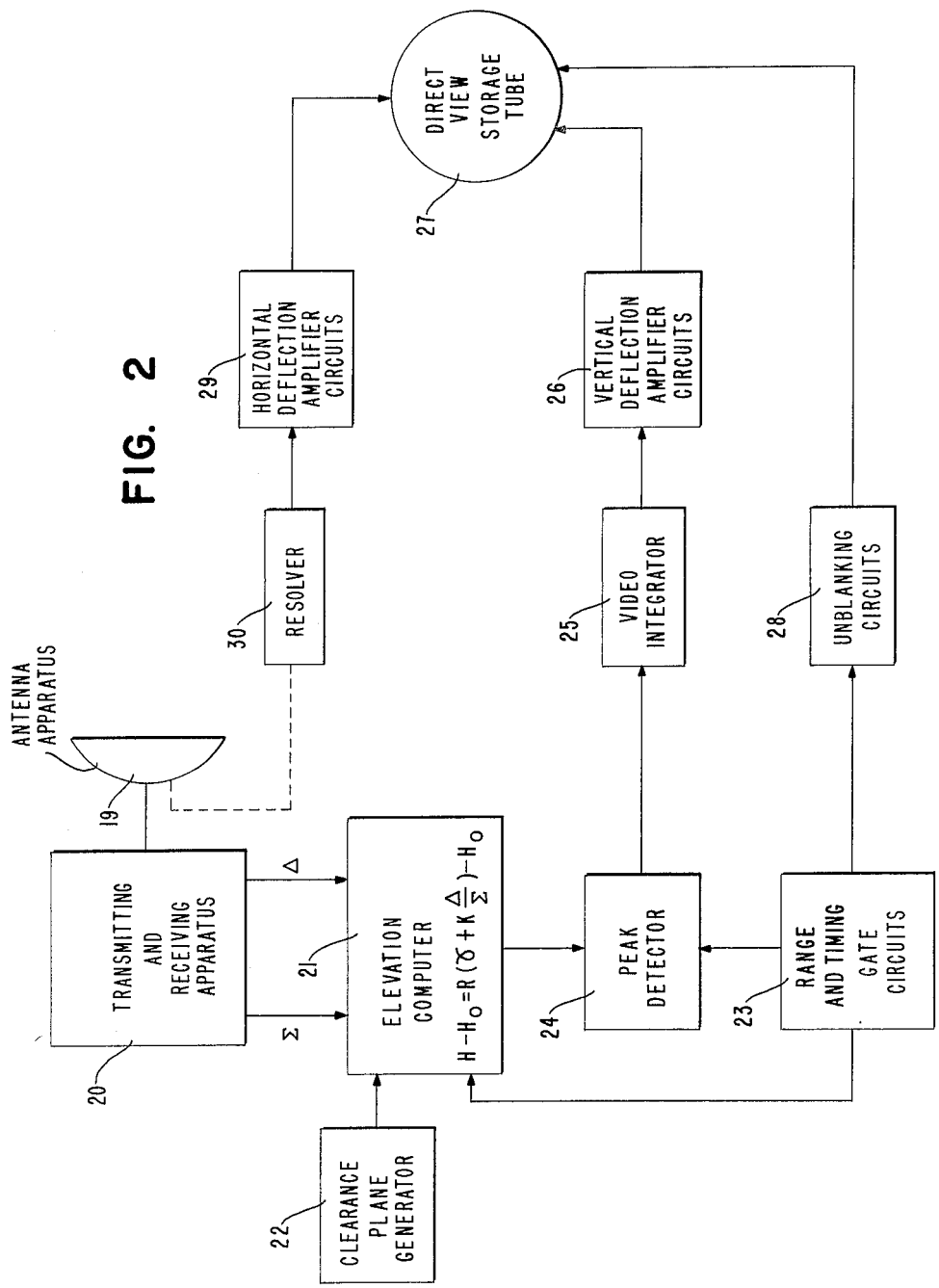

United States Patent Office 3,243,813
Patented Mar. 29, 1966

3,243,813
MONOPULSE RADAR SYSTEM PROVIDING COMMON AMPLIFICATION OF PLURAL SIGNALS
Willard P. Summers, Owego, N.Y., assignor to International Business Machines Corporation, New York, N.Y., a corporation of New York
Filed May 15, 1961, Ser. No. 110,147
4 Claims. (Cl. 343—16)

The present invention is concerned broadly with a radar system, and more particularly with an improved apparatus for determining target elevation.

Radar systems have been conventionally used in obtaining range information of target objects relative to the location of the radar apparatus, i.e., distance and bearing. Recently in the case of airborne systems their use has been extended to provide target elevation and angular disposition information, and it is this use that is of particular interest here. Elevation information is especially important when the aircraft is operating at low altitudes. Thus, in bad weather or night operations over unfamiliar terrains, it is important to know not only that an obstruction exists in the path of movement of the plane, but also the elevation of the obstruction relative to that of the aircraft so that it is known whether or not avoidance measures must be taken.

Known apparatus for making elevation determinations of this kind specially relates the sum and differences of reflected microwave energy signals received from a pair of radiation patterns directed toward a particular target object. One especially troublesome aspect of this equipment has been that the sum and difference signals are treated by separate electronic amplifying apparatus necessitating close tracking and amplification monitoring of the systems in order to eliminate these factors as a significant source of error. In fact, heretofore, the required substantial identicalness of operation of such apparatus could only be achieved by the use of relatively complex and expensive equipment.

It is therefore a primary object of the present invention to provide a system for specially relating a plurality of alternating signals in the microwave range to one another where a high degree of tracking and sameness of amplification are required.

Another object is the provision of a system for treating the sum and difference return signals of a two-lobed radar pattern in a substantially identical manner without resorting to separate monitored means for target elevation determination.

A further object is the provision of such a system in which the determination of the angle of a reflected radar beam relative to a reference base is obtained.

A still further object is the utilization in such a system of a single velocity-modulated tube for the simultaneous equal amplification of a plurality of radar echo signals.

Briefly, the objects of the invention are accomplished by radiating a double-lobed microwave signal toward an object the elevation and range of which is to be determined and the general direction angle of which with respect to a reference line is known. The reflected signals received from target points are heterodyned to provide two voltages of different frequencies in the microwave range. The heterodyned signals are simultaneously amplified by a single high-gain broad band velocity-modulated amplifying means. Separate filtering means are arranged to receive the output of the amplifying means and pass the amplified sum and difference signals as separate entities. The phase relationship of the filtered signals is determined and by appropriately relating the magnitudes and phase relationship to one another both the angle of declination and elevation of the target are obtained directly.

The foregoing and other objects, features and advantages of the invention will be apparent from the following more particular description of a preferred embodiment of the invention, as illustrated in the accompanying drawings.

In the drawings:

FIG. 2 is a functional block diagram of a radar system incorporating the elevation computer of the invention;

Figure 1:
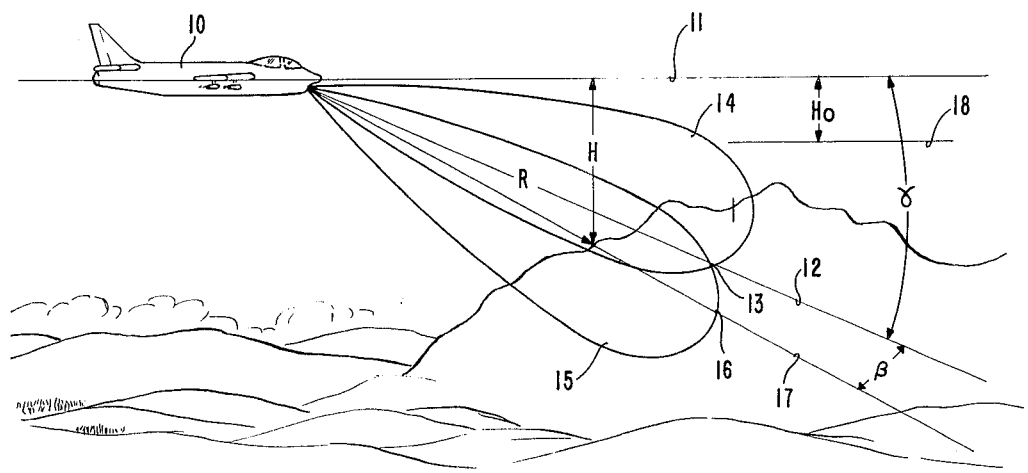
FIG. 1 is a perspective elevational view of an aircraft radiating a twin-lobed radar antenna pattern in a generally forward direction with certain geometric relationships shown.

Referring now to FIG. 1, an aircraft 10 is indicated as traveling along a substantially horizontal path 11 relative to ground track which path also coincides with what is frequently referred to as the flight reference vector. The aircraft is equipped with a radar system of the type generally termed monopulse which is aimed or directed downwardly toward the terrain from below the aircraft at a slight angle $\gamma$, that is, the angle between a line 12 drawn from the point of emission of the radar beam from the aircraft through the crossover point 13 of two lobes 14 and 15 of microwave energy comprising the beam and the line 11. The line 12 is customarily termed boresight and the angle $\gamma$ as the angle of boresight.

Although the flight vector fuselage reference line and horizontal are shown in coincidence, of course, in actuality these do not remain in coincidence with another for more than a short period of time. Also, throughout the following description the angle $\gamma$ is spoken of as being measured from the flight reference vector; however, this is not meant to preclude referencing this angle to horizontal, fuselage reference line, or any other line.

A particular target point of the terrain indicated at 16 with respect to which the specified geometric determinations are to be made is indicated as having a range R, a vertical spacing H relative to the flight vector of the aircraft and an angular displacement from boresight 12 of $\beta$. For ease of understanding, the line 17 has been provided extending the range vector.

In many cases it is desirable that an arbitrary horizontal plane 18, termed a clearance plane, be used to provide a minimal clearance of the aircraft and ground based obstructions of a pre-assigned magnitude $H_0$. The clearance plane is, in effect, a safety factor and a particular one is chosen after consideration of a number of conditions such as velocity of the aircraft, average height to be maintained, weather, general nature of the terrain, and the like.

The two antenna lobes 14 and 15 in elevation appear as a pair of substantially tear-shaped fields of energy, and although it is true that the antenna patterns are three-dimensional, only their characteristics in the vertical plane are shown and it is assumed that when viewed in plan the two lobes are in registry. It is also pertinent to note at this time that points being scanned and reflecting signal information back to the receiving antenna which are located at equal angles in a vertical plane from boresight, provide incoming signals of equal strength. Thus, lines directed away from the point of radar energy emission at equal angles $\beta$ on each side of boresight 12, are also equal energy lines. As will be brought out in detail below, it is an important function of the invention to determine continuously the magnitude of $\beta$ and also its direction relative to boresight (i.e., above or below) thereby completely positioning any particular target point or points relative to boresight and the aircraft.

Usual monopulse radar technique is to radiate periodically energy pulses of a microwave character in the general direction of the target area. Between the interrogation transmissions the radar apparatus receives echoes, or reflections, of the interrogation pulses from the different portions of the terrain. Thus, in response to any one probing pulse a plurality of reflections are obtained from the different points of the terrain on which the pulse impinges. Each of these reflected signals is sensed by either or both antenna lobes 14 and 15 providing the basic information by which the position and height of a given target can be obtained.

By way of example, the particle 16 reflects energy in a direction generally toward the aircraft 10 and which is sensed by both lobes of the antenna pattern. The two sensed signals can vary from one another in both amplitude and phase relation which variations it is the general purpose of the receiving apparatus to determine and relate. It is sufficient at this point to note that the receiving apparatus in the main operates on the two reflected signals from a given point and converts them to two new signals corresponding to the sum $\Sigma$ and difference $\Delta$, respectively, of the reflected signals.

A more definitive exposition of the fundamentals of radar operation, and in particular monopulse radar, can be found in the text, "Introduction to Monopulse," by Donald R. Rhodes, 1959 edition, published by McGraw-Hill Book Company, Inc., New York, New York.

As to mathematical relationships, the depression angle $\beta$ of any particular particle of terrain in the vertical plane of the antenna apparatus is expressed by the following equation:

$$\beta = K \frac{\Delta}{\Sigma}$$

where: the factor K is a constant that is characteristic of the antenna apparatus and $\Delta$ and $\Sigma$ are the difference and sum signals.

Not only is the magnitude of the angle $\beta$ important, but also the sense of the angle, that is, whether it is located above or below boresight. This sense is directly indicated by the phase relationship of the sum and difference signals which will be obtained in a manner that will be set forth below. Following the theoretical exposition in the above-indentified Rhodes' text, a target point located below the line of boresight is assigned a negative value for $\beta$, whereas a point located above boresight is ascribed a positive value.

Still referring to FIG. 1, it is seen that the height of the aircraft, H, above a given target point can be represented as follows:

$$H = R \sin(\gamma + \beta)$$

The slant range R, that is, the straight line distance from the aircraft to the target point reflecting the signals, is determined in a way well known in the art by relating the time elapsed from the projection or radiation of the microwave energy toward the target point and the time that the reflected signal is sensed.

As commented above, the angle of boresight is a comparatively small angle and in most cases less than 5°. This permits a simplification of the equation for the height, namely:

$$H = R(\gamma + \beta)$$

This, of course, is possible because the sine of small angles can be represented by the same angles in radian measure with only slight error.

It was also remarked above that an arbitrary clearance dimension $H_0$ or clearance plane can be provided. This is reflected in the above equation by subtracting the clearance plane dimension from each side of the equation as follows:

$$H - H_0 = R(\gamma + \beta) - H_0$$

Accordingly, a final mathematical representation of the elevation of the aircraft relative to a target point in terms of obtainable parameters is as follows:

$$H - H_0 = R\left(\gamma + \frac{K\Delta}{\Sigma}\right) - H_0$$

With reference now to FIG. 2, there is indicated an antenna apparatus 19 for sending and receiving microwave energy. Transmitting and receiving apparatus 20 is operatively connected to the antenna apparatus to provide the electromagnetic energy which is radiated toward the target and to handle the echo signals received by the antenna apparatus in a way which will be described generally at this time.

The output of the transmitting and receiving apparatus 20 comprised of sum and difference signals indicated as $\Sigma$ and $\Delta$, respectively, is fed into a special elevation computer 21 where the aforedescribed mathematical determination of the terrain elevation is electronically effected. Since the boresight angle $\gamma$ here is a constant determined by the particular angle at which the antenna apparatus 19 is mounted with respect to the aircraft, this can be represented electrically by a constant voltage signal.

Additionally, the clearance plane distance $H_0$ information is presented to the elevation computer from a clearance plane generator 22. The generator comprises a conventional resistance potentiometer arranged across a voltage supply source so that a selectively variable voltage output is obtainable representative of the range of available clearance planes.

The elevation computer is provided with timing gate information and radar range setting information from appropriate circuits 23. Thus, after consideration of factors such as velocity of the aircraft, time of day when operation is to be carried out and weather conditions, among others, a particular range of operation for the radar apparatus is chosen which in the estimation of the pilot is believed to be best. As to the timing gate information, is use and purpose are felt to be self evident. These circuits are well known in the art and suitable examples for present purposes can be found in the book entitled "Electronic Fundamentals and Applications," by John D. Ryder, 1959 edition, published by Prentice-Hall, Inc.

Although the detailed structure of the elevation computer 21 made in accordance with the invention will be set forth below, in order to show the operation of the invention in its environment it is only necessary at this point to note that an output signal is made available by the computer which is proportional to the difference of the actual height of the aircraft above a given target point H and the selected clearance plane $H_0$. This voltage is then fed into a peak detector 24 which selects those voltages indicating the highest elevation of target points in the path of the aircraft, or in a sector in the path, and excludes other values of lower magnitude. Any of a number of different types of circuits provide a satisfactory peak detecting function and, in general, accomplish this by charging a capacitor with the input voltage signals in a continuous manner so that the highest elevation of the terrain giving rise to the reflected signals received are represented as the total charge on the capacitor.

Preparatory to receiving signals from the elevation computer, the peak detector 24 is brought to a threshold reference level by an appropriate clearing pulse supplied under control of the timing gate circuits 23 and is thus synchronized with the total radar system. Subsequent information, or echo responses, received by the antenna 19 charges up the peak detector as noted above.

To obtain best results, a video integrator 25 fed by the output of the peak detector is provided to filter out both noise introduced by the system and that generated exernally of the system and thereby effect a visual presentation that is relatively insensitive to noise and other spurious signals. For a fuller understanding this type of equipment reference can be made to the above-mentioned text, "Electronic Fundamentals and Applications," by John D. Ryder.

The video integrator 25 passes a filtered substantially noise-free output signal to conventional vertical deflection circuits 26 which control the vertical sweep of a direct-view cathode ray tube 27. This type of storage tube is advantageous for use in an aircraft where high ambient light conditions are frequently encountered in that it provides a display of exceptional brightness and clarity. Briefly, as to theory of operation, video information from the vertical deflection circuits actuates a storage mesh of the tube (rather than a phosphor in a conventional CRT) flooding the storage mesh with low velocity electrons in a continuous manner. Certain of the electrons are attracted by the mesh and accelerated toward a phosphor-prepared surface thereby providing a display of high brilliance. One such direct view storage tube satisfactory for present purposes is commercially available under the designation RCA 7448, manufactured by the Radio Corporation of America, Camden, N.J.

Coupling the output information of the vertical deflection circuits 26 to the vertical deflection plates of the storage tube 27 influences the electron writing beam vertically in proportion to the vertical portions of the information sensed by the antenna. Thus, the electron beam of the storage tube is deflected in a vertical direction during interrogation providing a corresponding elevation indication on the tube that reflects the vertical relation of targets sensed by the radar.

A single spot of information is displayed on the tube corresponding to the highest elevation being sensed within that particular vertical plane, that is, those elevations sensed within the preset range interval. This is provided through the operation of what are sometimes termed unblanking circuits 28 which unblank the storage tube immediately prior to the end of a timing gate before a scanning pulse is radiated toward the target. A conventional blocking oscillator will serve this purpose, and one such illustrated on pages 578–580 in the above-noted handbook by John D. Ryder is fully satisfactory.

Horizontal sweep signals are fed to the appropriate deflection plates of the tube 27 by a conventional horizontal sweep generator and circuits 29 which in turn is driven by a resolver 30, for example, to provide correspondence to the instantaneous azimuth position of the antenna apparatus during horizontal scanning. This type of function is a familier one in the electronic art and no details are given here. For further information, reference can be made to RICO Handbook, No. 57, entitled "Resolver Handbook," published in 1954 by Reeves Instrument Corporation, New York 28, N.Y.

Figure 3:
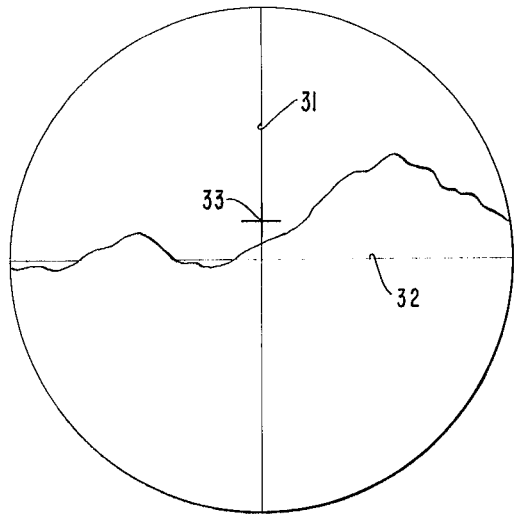
FIG. 3 is an elevational forwardly directed view of the terrain as presented by the radar system of FIG. 2.

As a direct consequence of oscillating the antenna apparatus horizontally at a much slower rate than the vertical electronic scanning during interrogation of the terrain, the dots on the face of the storage tube (representing the highest elevations) are quite close together, and, in effect, provide a single line profile representing the highest elevations over the full sector area of horizontal sweep of the antenna apparatus. Thus, FIG. 3 illustrates a typical profile view from the aircraft in a generally forward direction over a sector of say, approximately 120°.

The intersection point of crosshairs 31 and 32 indicates, in elevation, the location of the aircraft relative to the terrain. As shown, the aircraft is at substantially the same height as that of the highest vertical point directly in the path of travel. It is usual, however, to have the information on the storage tube reflect not the actual distance H, but rather include a clearance plane as a safety factor, and thus display the position as $H-H_0$.

Additionally, for convenience a cursor 33 is mounted on the face of the display device to indicate the exact location of the aircraft with respect to the highest elevation and, of course, to give a side-to-side representation of the flight path. In providing a true indication of elevation the pilot is able to fly as close to the terrain as he may in his judgment decide is advisable and to choose the correct maneuvers for evasive purposes insofar as they are conditioned by the elevation clearance.

Figure 4:
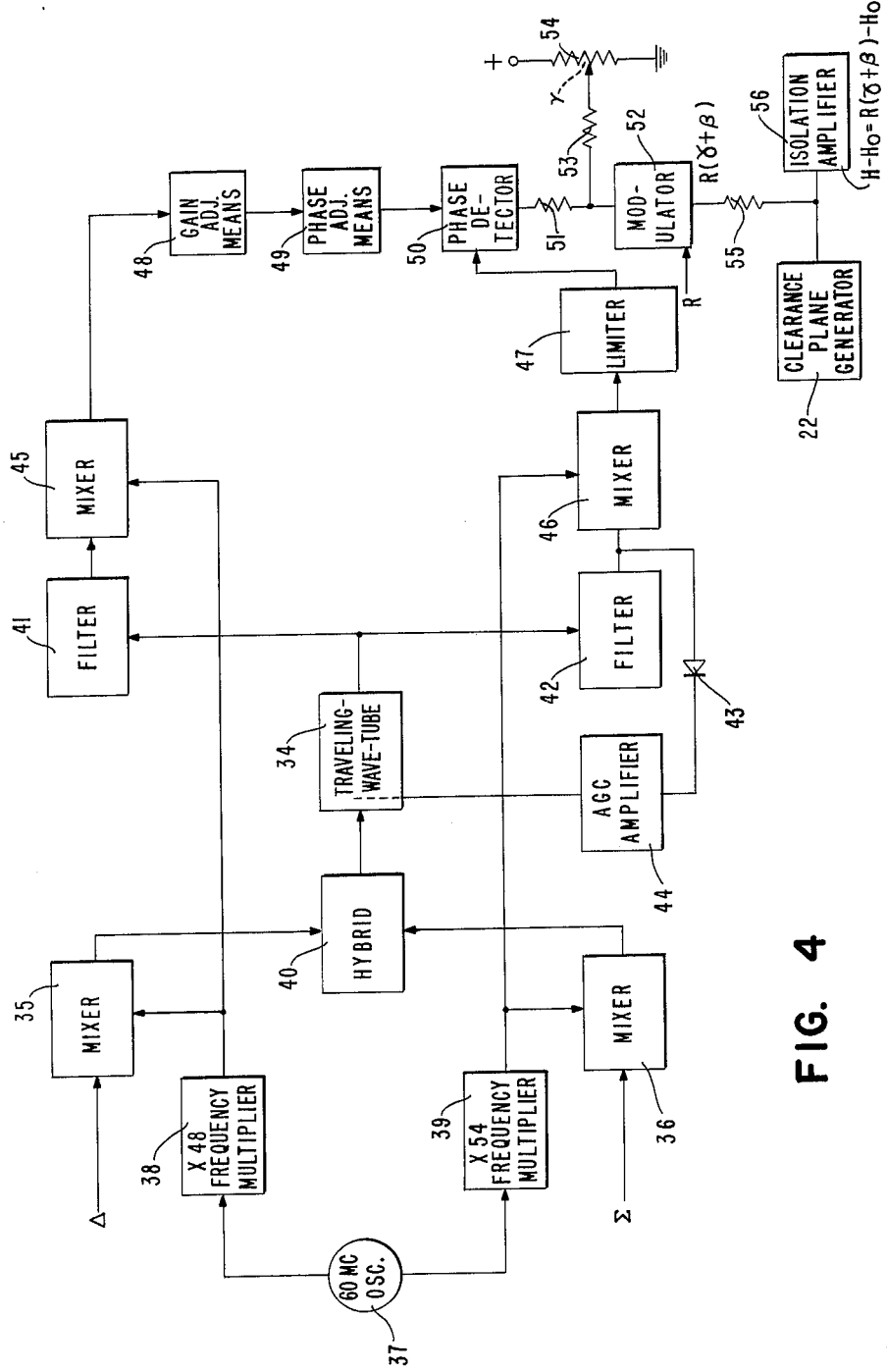
FIG. 4 is a functional block diagram of the novel elevation computer.

In FIG. 4, illustrating a preferred embodiment of the elevation computer 21 in its more detailed aspect, it is assumed for illustrative purposes only that the $\Delta$ and $\Sigma$ signals received from the transmitting and receiving apparatus 20 have a frequency of sixty (60) megacycles.

As noted, a basic active element of the novel computer being described here is a traveling-wave-tube 34 which can receive a plurality of signal voltages of differing frequency and amplify them the same amount to within a high degree of accuracy. This feature is important in that it overcomes certain difficult problems normally associated with the use of separate amplifying means for this purpose, namely, the close tracking requirements and amplification control.

Since the operation of a traveling-wave-tube is most feasible in the ultrahigh and microwave frequency ranges, means are provided for converting the sixty megacycle $\Delta$ and $\Sigma$ voltages to two distinct signals of differing frequency within the required frequency range. Thus, a mixer 35 receives the sixty megacycle $\Delta$ input and beats it with a higher frequency voltage which for exemplary purposes is given here as 2880 megacycles. Similarly, the $\Sigma$ voltage is beat in a mixer 36 with a different frequency voltage, although in substantially the same range as the frequency with which the $\Delta$ voltage is mixed, which for present purposes is given as 3240 megacycles. Accordingly, the $\Delta$ output of mixer 35 has a frequency of 2880±sixty megacycles, and the $\Sigma$ output of mixer 36, 3240±sixty megacycles.

The two heterodyning voltages are obtained by feeding the output of a sixty megacycle local oscillator 37 into an x 48 frequency multiplier 38 and an x 54 frequency multiplier 39, which provide outputs of 2880 and 3240 megacycles, respectively. A satisfactory oscillator for this purpose is described on page 360 et seq. of "Handbook of Piezoelectric Crystals for Radio Equipment Designers," WADC Technical Report 56–156, October 1956. As to the frequency multipliers, excellent examples are set forth on pages 371 et seq. of vol. 11 of the RADLAB series entitled "Techniques of Microwave Measurements."

The output of the mixers 38 and 39 are operatively connected to a hybrid circuit 40 which adds the two signals to form a single voltage signal that can be received and amplified by the traveling-wave-tube 34. The term hybrid is used here to refer to a passive waveguide that functions to add the energy obtained from the prime system lines serving as outputs for the mixers 35 and 36 and to provide a single output. The principles of operation are well known and a full description of a coaxial ring network satisfactory here is to be found in the above-noted RADLAB volume on page 522 et seq.

The output of the hybrid 40 is coupled to the input of the traveling-wave-tube 34 where a component of its field is used to produce a velocity-modulation of a stream of electrons within the tube, resulting in amplification of the input signal. A direct benefit of this continuous interaction of a field wave and an electron stream is the substantial identicalness of gain over a relatively large bandwidth as compared to results obtainable with ordinary types of electron tubes. One such tube found to be fully adequate for the described use and over the defined frequency range is the S-band gridded traveling-wave-tube, type HA–1, manufactured by Huggins Laboratories, Inc., Menlo Park, Calif.

Also, since the different signals are being handled in the same tube, any variations in gain resulting from outside noise or transient conditions, and the like, will affect both signals equally. Further, because the phase delay of a traveling-wave-tube is inherently linear, and thus basically a primary function of the accelerating voltage of the tube, small distortion results from this source.

Output of the tube 34 is simultaneously fed into a pair of filters 41 and 42 of such characteristics as to permit them to pass 2820 megacycles and 3180 megacycles frequency components, respectively.

The requirements of these filters are that they have a Butterworth response such as to provide a maximally flat response over the operating band and maximum attenuation outside the operating band. In particular, for such a maximally flat condition the following holds:

$$\alpha = 10 \log_{10}\left[1 + \left(\frac{f\alpha}{\Delta f}\right)^{2N}\right]$$

where:

$\alpha$ is the filter attenuation in decibels for the bandwidth $f\alpha$ under consideration,
$\Delta f$ is the $-3$ decibels bandwidth of the filter and N is the number of resonant stages in the filter.

After the amplified sum signal $\Sigma$ is passed by the filter 42 it is amplitude detected by a detector 43, amplified by an AGC amplifier 44 and fed back to the control grid of the tube 34. This feedback acts to vary the gain of the tube inversely as the amplitude of the $\Sigma$ signal as seen at the output of the filter 42. Gain controlling the tube in this manner causes the amplified filtered $\Delta$ signal at the output of the filter 41 to have a magnitude approximately representative of the ratio of the difference voltage to the sum voltage, that is $$\frac{\Delta}{\Sigma}$$

The output of the filter 41 is heterodyned in a mixer 45 with the 2880 megacycle output of the frequency multiplier 38, and, similarly, a mixer 46 heterodynes the output of filter 42 with the 3240 megacycle output of the frequency multiplier 39. This translates the amplified $\Delta$ and $\Sigma$ signals into 60 megacycle form which is a more convenient one for a phase comparison operation to be carried out subsequently.

The $\Sigma$ signal output of mixer 46 is operatively connected to a limiter 47 where it is limited since as will be seen later only phase information is required of this signal. On the other hand, the output of the mixer 45 is passed sequentially through a gain adjusting means 48 and a phase adjusting means 49. These last two means are not functional requisites to the operation of the invention, but serve merely as a means for providing preliminary adjustments on installation to compensate for minor variations in certain portions of the apparatus such as the antenna 19, for example, or when replacements are made.

The outputs of the limiter 47 and the phase adjusting means 49 are then fed into a phase detector 50. It is seen that since the $\Sigma$ signal is limited and since the $\Delta$ signal output of the mixer 45 has a magnitude representative of $$\frac{\Delta}{\Sigma}$$

the output of the phase detector is proportional to $\beta$ or expressed mathematically:

$$\beta = \frac{\Delta}{\Sigma} \cos \phi$$

where: $\phi$ is the phase angle between $\Delta$ and $\Sigma$ voltages.

A phase detector having the necessary characteristics for the above-described use is set forth on page 516, volume 19, of RADLAB series entitled "Waveforms" by Chance et al.

The voltage representing $\beta$ is passed through a resistance 51 and presented to the input of a modulator 52.

Simultaneously, a second voltage representing the angle of boresight $\gamma$ is presented to the input of the modulator 52 in common with the $\beta$ voltage. The $\gamma$ voltage is provided through a resistance 53 connected to the variable point of a slide potentiometer 54 shunted across ground and a suitable positive voltage source. With the potentiometer 54 properly set, a total voltage is applied to the input of the modulator 52 that continuously corresponds to $(\gamma + \beta)$.

The modulator is controlled by a voltage input obtained from the range circuits 23 and corresponding to the range R. Accordingly, the output of the modulator is a voltage the magnitude of which represents $R(\gamma+\beta)$.

The modulator output is passed through a resistance 55 to be operatively related to the input of an isolation amplifier 56. At the same time, a voltage of negative polarity with respect to ground and magnitude corresponding to $H_0$ is obtained from the clearance plane generator 22 thereby providing at the output of the amplifier 56 a voltage corresponding to the desired elevation information, $$H - H_0 = R(\beta + \gamma) - H_0$$

Although throughout the above description all references are to the presentation of the elevation information in profile mode, it is to be understood the invention is equally applicable for use in plan mode.

While the invention has been particularly shown and described with reference to a preferred embodiment thereof, it will be understood by those skilled in the art that the foregoing and other changes in form and details may be made therein without department from the spirit and scope of the invention.

What is claimed is:

1. An alternating voltage signal treating system for providing a voltage output indicative of $\beta$ defined by the mathematical relationship, $$\beta = \frac{\Delta}{\Sigma} \cos \phi$$

where $\Delta$ and $\Sigma$ are, respectively, the difference and sum of two radar echo voltages and $\phi$ is the phase angle between them, comprising:

(1) separate mixing means for receiving the $\Delta$ and $\Sigma$ signals individually;
(2) first and second heterodyning voltage supplies of two different frequencies at least in the ultra-high frequency range operatively connected to said separate mixing means;
(3) a traveling-wave-tube fed by the heterodyned $\Delta$ and $\Sigma$ signals for amplifying the two simultaneously;
(4) first and second filters fed by the output of said traveling-wave-tube for individually passing the amplified $\Delta$ and $\Sigma$ signals;
(5) feedback means interconnecting the output of the $\Sigma$ filter and the control grid of the tube; and
(6) phase detection means operatively related to the outputs of the filters providing an output voltage the magnitude of which corresponds to $\beta$.

2. A voltage signal treating system as in claim 1, in which preliminary gain and phase adjusting means are provided to compensate for variations in operational characteristics of portions of the system on installation and when replacements are made.

3. A voltage signal treating system as in claim 1, in which a voltage amplitude limiting means is electrically interposed between the filtered sum signal and the phase detector reducing the effect of the magnitude of the said filtered sum signal on the obtained $\beta$ voltage.

4. In combination: an airborne monopulse radar system including radiation means directed along a substantially linear path, antenna pattern means of at least two lobes for providing a pair of reflection signals from each target point, and means for forming distinct sum and difference signals from said reflection signal; a computer fed by said sum and difference signals comprising, velocity-modulated amplifying means for simultaneously handling said sum and difference signals, and phase detection means fed by the output of said amplifying means for providing an output voltage signal having a magnitude defined by the product of the cosine of the phase angle of said signals and the ratio of the difference signal to the sum signal, said product being representative of the angle of the target point relative to the line of radiation as referenced to the system location; and means operatively related with said product voltage for providing a signal voltage output corresponding substantially to the height of said system relative to the target point.

References Cited by the Examiner

UNITED STATES PATENTS 2,988,739  6/1961  Hoefer et al. _____ 343—16
2,995,750  8/1961  Holcomb et al. _____ 343—16.1

CHESTER L. JUSTUS, *Primary Examiner.*

J. J. BRENNAN, R. E. KLEIN, P. M. HINDERSTEIN,
*Assistant Examiners.*